(12) United States Patent
Godbole et al.

(10) Patent No.: US 7,996,210 B2
(45) Date of Patent: Aug. 9, 2011

(54) LARGE-SCALE SENTIMENT ANALYSIS

(75) Inventors: Namrata Godbole, New York, NY (US); Steven Skiena, Setauket, NY (US); Manjunath Srinivasaiah, New York, NY (US)

(73) Assignee: The Research Foundation of the State University of New York, Stony Brook, NY (US)

( * ) Notice: Subject to any disclaimer, the term of this patent is extended or adjusted under 35 U.S.C. 154(b) by 1141 days.

(21) Appl. No.: 11/739,187

(22) Filed: Apr. 24, 2007

(65) Prior Publication Data

US 2008/0270116 A1 Oct. 30, 2008

(51) Int. Cl.
G06F 17/27 (2006.01)

(52) U.S. Cl. .................. 704/9; 704/1; 704/10; 707/706; 707/707; 707/708; 715/255; 715/256; 715/259

(58) Field of Classification Search .................. 704/1, 9, 704/10; 715/255, 256, 259; 707/706–708
See application file for complete search history.

(56) References Cited

U.S. PATENT DOCUMENTS

| | | | |
|---|---|---|---|
| 2003/0182123 A1* | 9/2003 | Mitsuyoshi .................. | 704/270 |
| 2005/0091038 A1* | 4/2005 | Yi et al. .......................... | 704/10 |
| 2005/0125216 A1 | 6/2005 | Chitrapura et al. | |
| 2006/0069589 A1 | 3/2006 | Nigam et al. | |
| 2006/0112040 A1 | 5/2006 | Oda | |
| 2006/0200342 A1* | 9/2006 | Corston-Oliver et al. ...... | 704/10 |
| 2007/0073531 A1* | 3/2007 | Carter et al. ...................... | 704/4 |
| 2007/0208569 A1* | 9/2007 | Subramanian et al. ........ | 704/270 |
| 2008/0005051 A1* | 1/2008 | Turner et al. .................... | 706/20 |

OTHER PUBLICATIONS

Yi et al., Sentiment mining in WebFountain, 2005, IEEE Computer society, issn 1084-4627, pp. 1073-1083.*
Kanayama et al., Fully automatic lexicon expansion for domain-oriented sentiment analysis, 2006, EMNLP'06, ACL, pp. 355-363.*
Whitelaw et al., Using appraisal taxonomies for sentiment analysis, 2005, Citeseer, Proceedings of CIKM, pp. 1-5.*
Liao et al., Combining Language Model with Sentiment Analysis for Opinion Retrieval of Blog-Post, 2006, Citeseer, TREC, pp. 1-4.*
Namrata Godbole, et al., "Large-Scale Sentiment Analysis for News and Blogs," Internatioal Conference on Webblogs and Social Media, Mar. 26-28, 2007.

* cited by examiner

*Primary Examiner* — David R Hudspeth
*Assistant Examiner* — Lamont M Spooner
(74) *Attorney, Agent, or Firm* — Cooper & Dunham LLP; Robert T. Maldonado (57) ABSTRACT

A method for determining a sentiment associated with an entity includes inputting a plurality of texts associated with the entity, labeling seed words in the plurality of texts as positive or negative, determining a score estimate for the plurality of words based on the labeling, re-enumerating paths of the plurality of words and determining a number of sentiment alternations, determining a final score for the plurality of words using only paths whose number of alternations is within a threshold, converting the final scores to corresponding z-scores for each of the plurality of words, and outputting the sentiment associated with the entity.

7 Claims, 7 Drawing Sheets

LARGE-SCALE SENTIMENT ANALYSIS

BACKGROUND OF THE INVENTION

1. Technical Field

The present invention relates generally to data mining and, more particularly, to a system and method for sentiment analysis.

2. Discussion of Related Art

Sentiment analysis of natural language texts is a large and growing field. The analysis includes both methods for automatically generate sentiment lexicons and analyzing sentiment for entire documents.

Some methods for generating sentiment lexicons assume positive and negative sentiment using synonyms and antonyms. Such methods may not accurately capture the sentiment of a word. Other methods for generating sentiment lexicons using semantics, such as "and" and "but", or tone/orientation to determine a sentiment of a word. Such methods may have low accuracy.

Methods for analyzing sentiment treat only single complete documents, for example, to determine if a movie review is good or bad or quantify opinion from a product review.

Therefore a need exists for a method of generating an accurate sentiment lexicon and for determining a sentiment over a plurality of texts.

SUMMARY OF INVENTION

According to an embodiment of the present disclosure, a method for determining a sentiment associated with an entity includes inputting a plurality of texts associated with the entity, labeling seed words in the plurality of texts as positive or negative, determining a score estimate for the plurality of words based on the labeling, re-enumerating paths of the plurality of words and determining a number of sentiment alternations, determining a final score for the plurality of words using only paths whose number of alternations is within a threshold, converting the final scores to corresponding z-scores for each of the plurality of words, and outputting the sentiment associated with the entity.

According to an embodiment of the present disclosure, a method for determining a statistical sentiment associated with an entity includes inputting a plurality of texts associated with the entity, formatting the plurality of texts, processing the plurality of texts using a sentiment lexicon, determining a statistical sentiment for the plurality of texts processed using the sentiment lexicon, and outputting the statistical sentiment associated with the entity.

BRIEF DESCRIPTION OF THE FIGURES

Preferred embodiments of the present invention will be described below in more detail, with reference to the accompanying drawing.

DETAILED DESCRIPTION OF EXEMPLARY EMBODIMENTS

Newspapers and blogs express the opinion of news entities (people, places, things) while reporting on recent events. According to an embodiment of the present disclosure, a system and method assign scores indicating positive or negative opinion to each distinct entity in an input text corpus. The system and method comprise sentiment identification, which associates expressed opinions with each relevant entity, and sentiment aggregation and scoring, which scores each entity relative to others in the same class.

News can be good or bad, but it is seldom neutral. Although full comprehension of natural language text remains beyond the power of machines, the statistical analysis of sentiment cues can provide a meaningful sense of how the latest news impacts a given entity.

According to an embodiment of the present disclosure, an exemplary large-scale sentiment analysis system for news and blog entities has been built on top of the language text analysis system. Using the system, public sentiment on each of a plurality of tracked entities is determined over time. The sentiment may be monitored and aggregated over partial references in many documents. It should be noted that other text analysis systems may be implemented, and that embodiments of the present disclosure are not limited to Lydia text analysis.

Turning to the text analysis system; the text analysis system retrieves daily newspapers and analyzes a resulting stream of text. According to an embodiment of the present disclosure, the text analysis system is implemented to perform spidering and article classification, named entity recognition, juxtaposition analysis, synonym set identification, and temporal and spatial analysis. According to an embodiment of the present disclosure, named entity recognition includes Identifying where entities (people, places, companies, etc.) are mentioned in newspaper articles. According to an embodiment of the present disclosure, juxtaposition analysis identifies, for each entity, what other entities occur near it in an overrepresented way. According to an embodiment of the present disclosure, synonym set identification is implemented for using multiple variations of an entity's name. According to an embodiment of the present disclosure, temporal and spatial analysis establishes local biases in the news by analysing the relative frequency given entities are mentioned in different news sources.

According to an embodiment of the present disclosure, text is acquired from online newspaper sources by spidering the websites, A spider program attempts to crawl an entire web domain, and download all the web-pages. According to an embodiment of the present disclosure, a universal spider is implemented that downloads all the pages from a newspaper website, extracts all new articles, and normalizes them to remove source-specific formatting and artifacts.

Referring to identifying duplicate and near-duplicate news articles; Repeated instances of given news articles can skew the significance spatial trends analysis. Thus, the method seeks to eliminate duplicate articles before subsequent processing. Duplicate articles appear both as the result of syndication and the fact that old articles are often left on a website and get repeatedly spidered. By comparing hash codes on all overlapping windows of length w appearing in the documents, two documents that share a common sequence of length w can foe identified at the cost of an index at least the size of the documents themselves. The index size can be substantially reduced by a factor of p with little loss of detection accuracy by only keeping the codes which are congruent to 0 mod p. This will result in a different number of codes for different documents, however. Little loss of detection will happen the c smallest codes congruent to 0 mod p are selected for each article. The Karp-Rabin string matching algorithm proposes an incremental hash code such that all codes can be computed in linear time.

Through experimentation, it has been determined that taking the 10 smallest hashes of windows of size 150 characters that are congruent to 0 mod 100 gives a good sub-sampling of the possible hashes in a document, a reasonable probability that if two articles are near duplicates, then they will collide on at least two of these hashes and a reasonable probability that if two articles are unique, then they will not collide on more than one of these hashes. One of ordinary skill in the art would recognise that different values may be used, and that the disclosure is not to be limited to these exemplary values. An experimental set of 3,583 newspaper days resulted in a total of 253,523 unique articles with 185,398 exact duplicates and 8,874 near duplicates.

Figure 5:
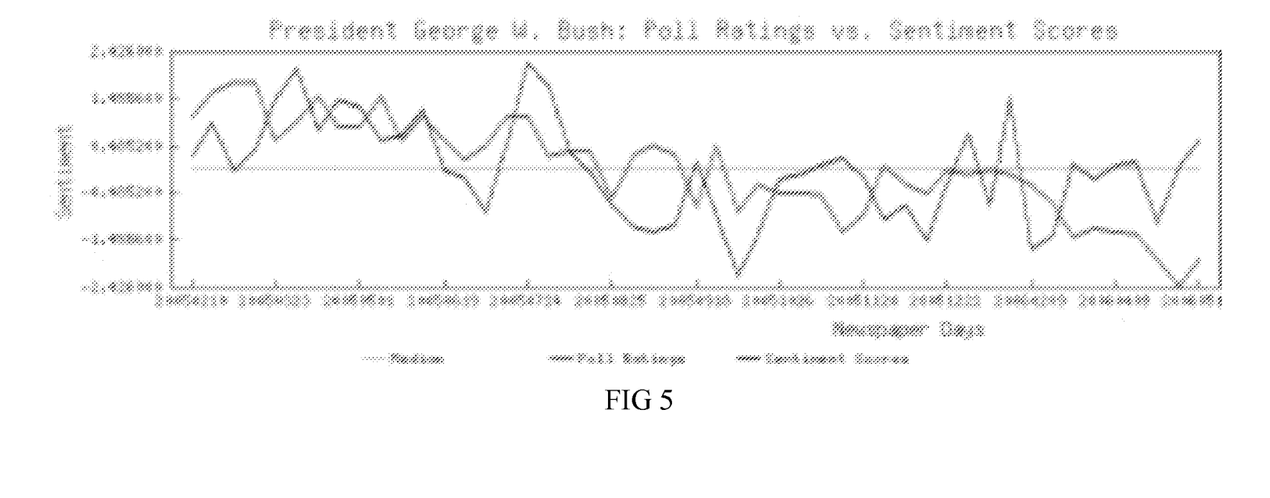
FIG. 5 is a graph for President George W. Bush: poll ratings vs. news sentiment scores according to an embodiment of the present disclosure.

Exemplary results of the sentiment analysis correlate with historical events. For example, consider FIG. 5 and the popularity of U.S. President George W. Bush—Gallup/USA Today conducts a weekly opinion poll of about 1,000 Americans to determine public approval of their President. FIG. 5 illustrates a positive correlation (coefficient 0.372) between a sentiment index and the approval ratings for President Bush. Deviations coincide with the U.S. invasion of Iraq and the run-up to the 2004 Presidential elections.

Figure 6:
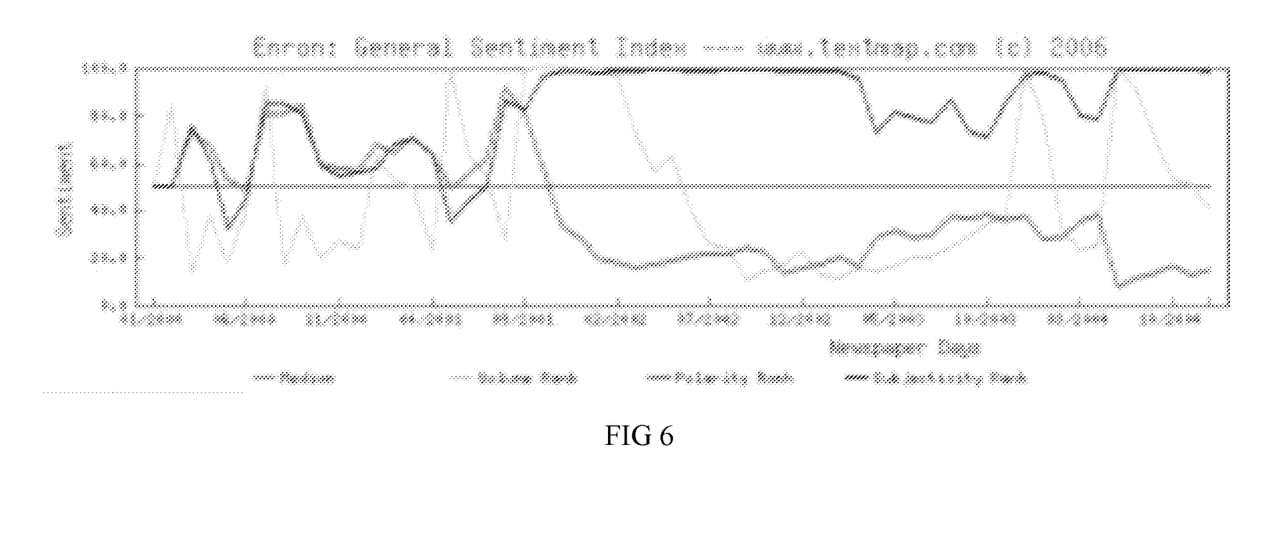
FIG. 6 is a graph of the collapse of Enron, captured by a news sentiment index according to an embodiment of the present disclosure.

In another example depicted in FIG. 6, the revelation of irregular accounting practices at Enron Corporation is tracked—Enron collapsed dramatically from one of the most respected U.S. corporations into bankruptcy over the last quarter of the year 2001. This decline is captured in Enron's sentiment time series, shown in FIG. 6.

Figure 7:
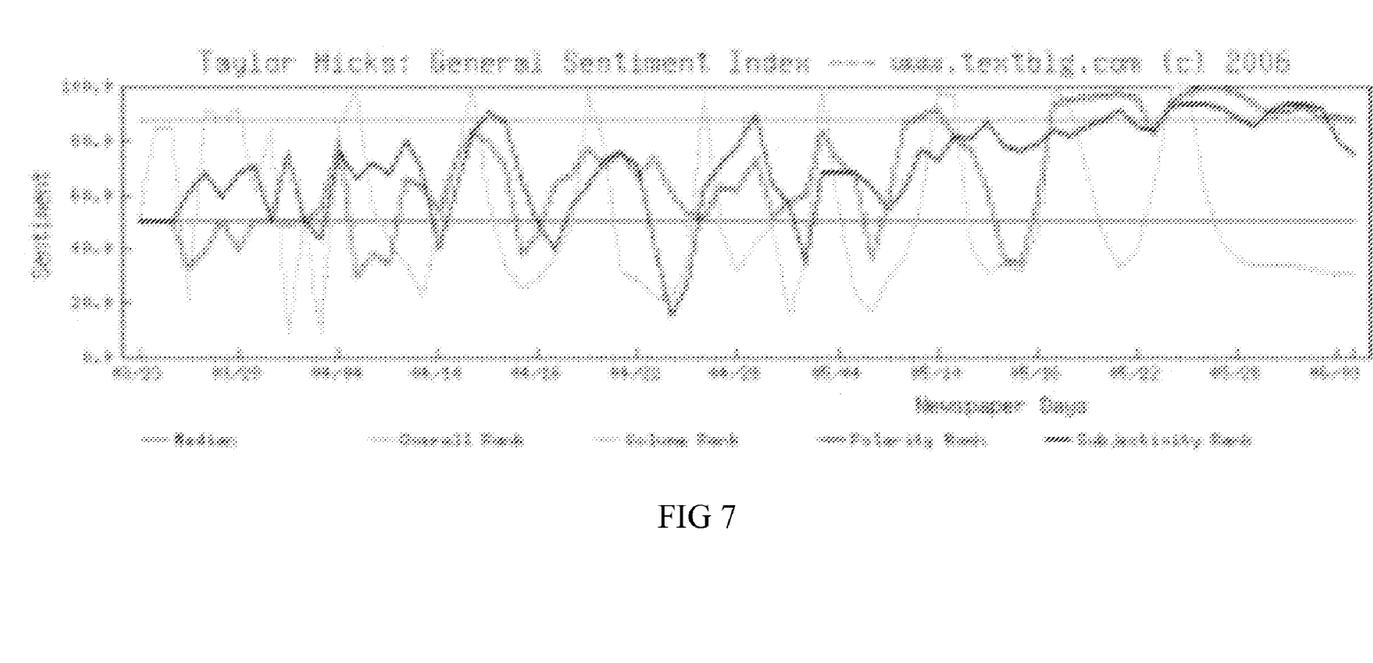
FIG. 7 is a graph of sentiment ratings for American Idol champion Taylor Hicks according to an embodiment of the present disclosure.

In yet another example, the television show American Idol was tracked—the singing champion of the popular American television show American Idol is decided by a poll of the viewing public. It has been reasoned that bloggers' sentiments about contestants should reflect the views of the public at large. FIG. 7 presents a sentiment analysis for the eventual winner (Taylor Hicks) during the May 24, 2006 climax of the tournament. According to the index, bloggers admire him better with every passing week. Come the final round, Hicks generates more positive sentiment than runner-up Katharine McPhee, indicating that it may have been possible to predict the winner.

Figure 1:
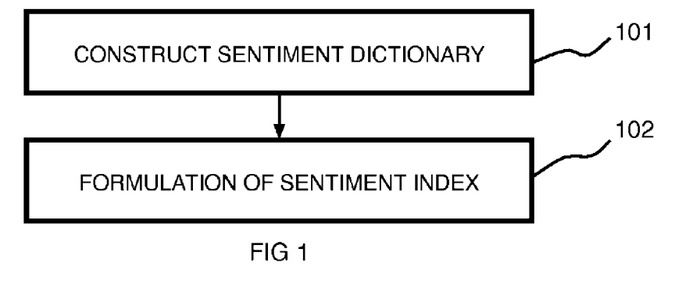
FIG. 1 is a flow chart of a method for forming a sentiment analysis system according to an embodiment of the present disclosure.

According to an embodiment of the present disclosure, a sentiment analysis system implements an algorithmic construction of sentiment dictionaries 101 and a sentiment index formulation 102 (see FIG. 1).

Figure 2:
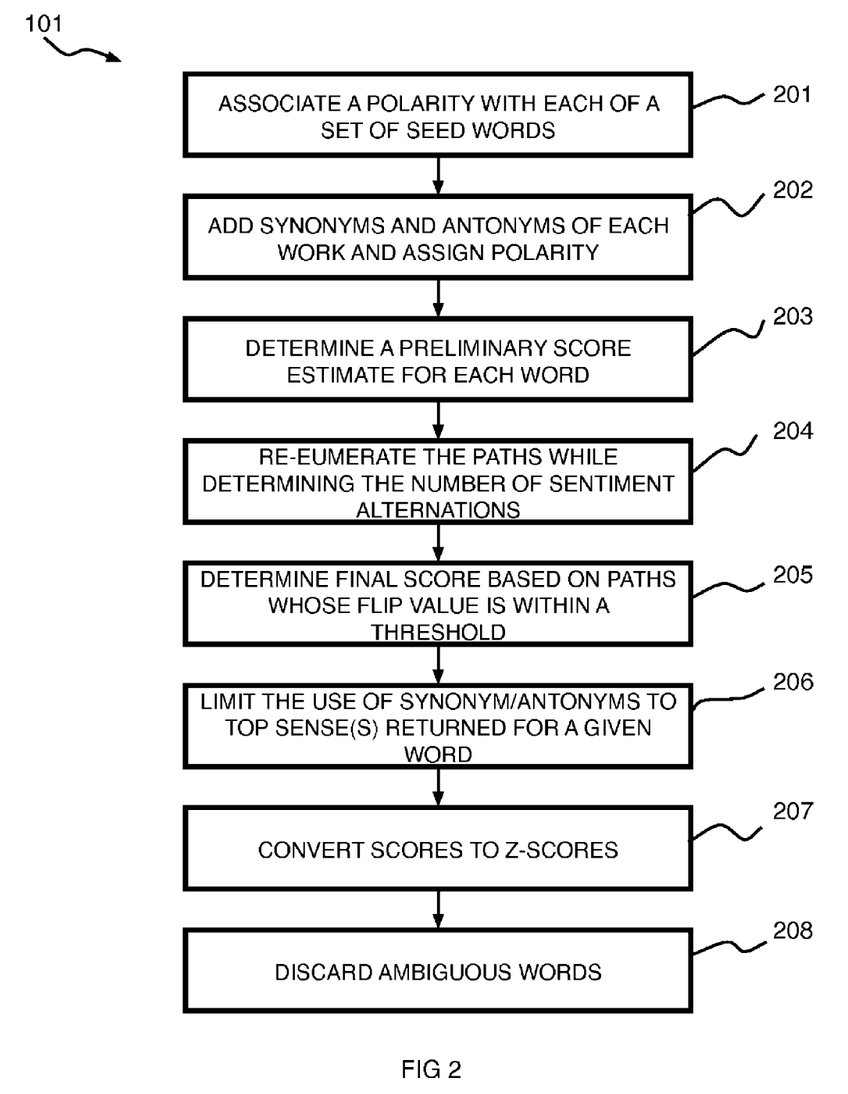
FIG. 2 is a flow chart of a method for constructing a sentiment dictionary according to an embodiment of the present disclosure.

Referring to FIG. 2 and the algorithmic construction of sentiment dictionaries 101, the sentiment index relies on tracking reference frequencies to adjectives with positive and negative connotations 201. The method expands small candidate seed lists of positive and negative words into full sentiment lexicons using path-based analysis of synonym and antonym sets 205/206, for example, in WordNet. Sentiment-alternation hop counts are used to determine the polarity strength of the candidate terms and eliminate the ambiguous terms.

Referring to the sentiment index formulation 102—there is considerable subtlety in constructing a statistical index that meaningfully reflects the significance of sentiment term juxtaposition. A method according to an embodiment of the present disclosure uses juxtaposition of sentiment terms and entities and a frequency-weighted interpolation with world happiness levels to score entity sentiment.

According to an embodiment of the present disclosure, an entity may be a person, place, or thing. For example, an entity may be a document, a group of entities, a relationship between entities, etc. Where the entity being described by the statistical sentiment is a group of entities, a relationship between entities, etc, for clarity, the group or relationship may be described as being of or between component entities.

Referring more particularly to the generation of a sentiment lexicon 101; sentiment analysis depends on the ability to identify the sentimental adjectives in a corpus and their orientation. Separate lexicons may be defined for each of a plurality of sentiment dimensions (e.g., general, health, crime, sports, business, politics, media, facts, opinions). Enlarging the number of sentiment lexicons permits greater focus in analyzing particular phenomena, but potentially at a substantial cost in human curation. To avoid this, the method expands small dimension sets of seed sentiment words into full lexicons.

Note that exemplary embodiments of the present disclosure do not distinguish between opinion and fact as both contribute to public sentiment. However, given the module design of the lexicons, sentiment related to opinion and fact may foe separated.

Figure 8:
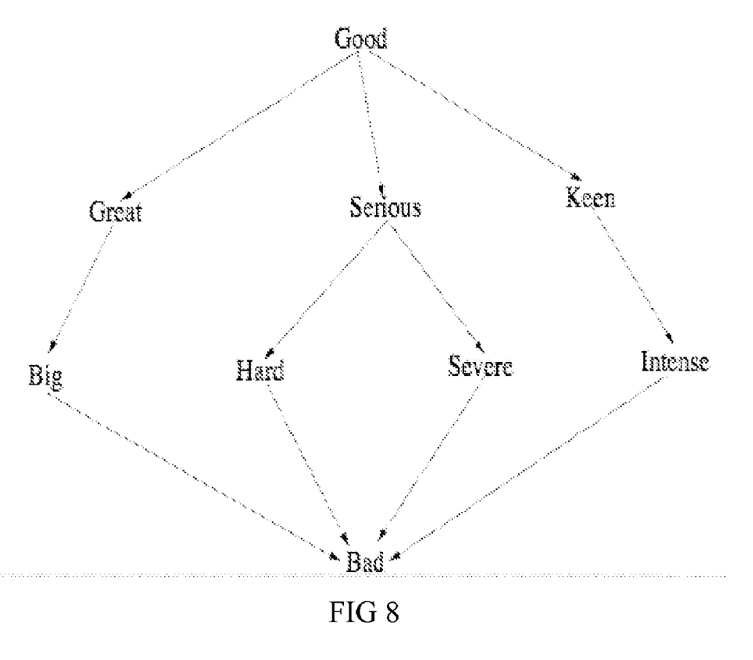
FIG. 8 illustrates four ways to get from bad to good in three hops.

An exemplary embodiment of lexicon expansion uses path analysis. Expanding seed lists into lexicons by recursively querying for synonyms using a computer dictionary, e.g., WordNet, is limited by the synonym set coherence weakening with distance. For example, FIG. 8 shows four separate ways to get from good to bad using chains of WordNet synonyms.

To counteract such, problems, the sentiment word generation method 101 expands a set of seed words using synonym and antonym queries. The method associates a polarity (positive or negative) to each word 201 and queries both the synonyms and antonyms 202.

Synonyms inherit the polarity from the parent, whereas antonyms get the opposite polarity. The significance of a path decreases as a function of its length or depth from a seed word. The significance of a word W at depth d decreases exponentially as score $$(W) = \frac{1}{c}d$$

for some constant c>1. The final score of each word is the summation of the scores received over all paths 205. Paths which alternate between positive and negative terms are likely spurious and may be limited 206.

A method for determining a sentiment lexicon 101 runs in more than one iteration. A first iteration calculates a preliminary score estimate for each word as described above 203. A second iteration re-enumerates the paths while calculating the number of apparent sentiment alternations, or flips 204. The fewer flips, the more trustworthy the path is. A final score is determined taking into account only those paths whose flip value is within a threshold 205 (e.g., a user defined threshold).

WordNet orders the synonyms/antonyms by sense, with the more common senses listed first. Accuracy is improved by limiting the notion of synonym/antonym to only the top senses returned for a given word 206.

TABLE 1

Sentiment dictionary composition for adjectives.

| Dimension | Seeds | | Algorithmic | | Hand-curated | |
|---|---|---|---|---|---|---|
| | Pos. | Neg. | Pos. | Neg. | Pos. | Neg. |
| Business | 11 | 12 | 167 | 167 | 223 | 180 |
| Crime | 12 | 18 | 337 | 337 | 51 | 224 |
| Health | 12 | 16 | 532 | 532 | 108 | 349 |
| Media | 16 | 10 | 310 | 310 | 295 | 133 |
| Politics | 14 | 11 | 327 | 327 | 216 | 236 |
| Sports | 13 | 7 | 180 | 180 | 106 | 53 |

TABLE 2

Comparison of algorithmically-generated and human-curated lexicons.

| Reference file | | Polarity of Intersection | | | |
|---|---|---|---|---|---|
| Name | Words | Diff. | Same | Recall | Precision |
| PolPMan | 657 | 21 | 468 | 0.712 | 0.957 |
| PolMMan | 679 | 5 | 549 | 0.809 | 0.991 |
| PolPauto | 344 | 42 | 221 | 0.642 | 0.840 |
| PolMauto | 386 | 56 | 268 | 0.694 | 0.827 |

In an experiment, the method for determining a sentiment lexicon 101, more than 18,000 words were generated as being within five hops from an exemplary set of seed words. Since the assigned scores followed a normal distribution, they may be converted to z-scores 207. Words lying in the middle of this distribution are considered ambiguous, meaning they cannot be consistently classified as positive or negative. Ambiguous words may be discarded by, for example, taking only a percentage of words front either extremes of the curve 208. The result is a sentiment lexicon for a given person, place or thing.

Table 1 presents the composition of algorithmically-generated and curated sentiment dictionaries for each class of adjectives.

The sentiment lexicon generation has been evaluated in two different ways. The first in an un-test. The prefixes un- and im- generally negate the sentiment of a term. Thus the terms of form X and unX should appear on different ends of the sentiment spectrum, such as competent and incompetent. Results show that precision increases at the expense of recall as (1) the number of path sentiment alternations are restricted and (2) by pruning increasing fractions of less polar terms.

The sentiment lexicons has been compared against those obtained by Wiebe, as reported in Table 2. There is a high degree of agreement between the algorithmically-generated lexicon according to an embodiment of the present disclosure and the manually curated lexicons. For example, the negative lexicon PolMauto contained such clearly positive words like bullish, agile, and compassionate, while the positive lexicon PolPman contained words like strenuous, uneventful, and adamant.

Figure 3:
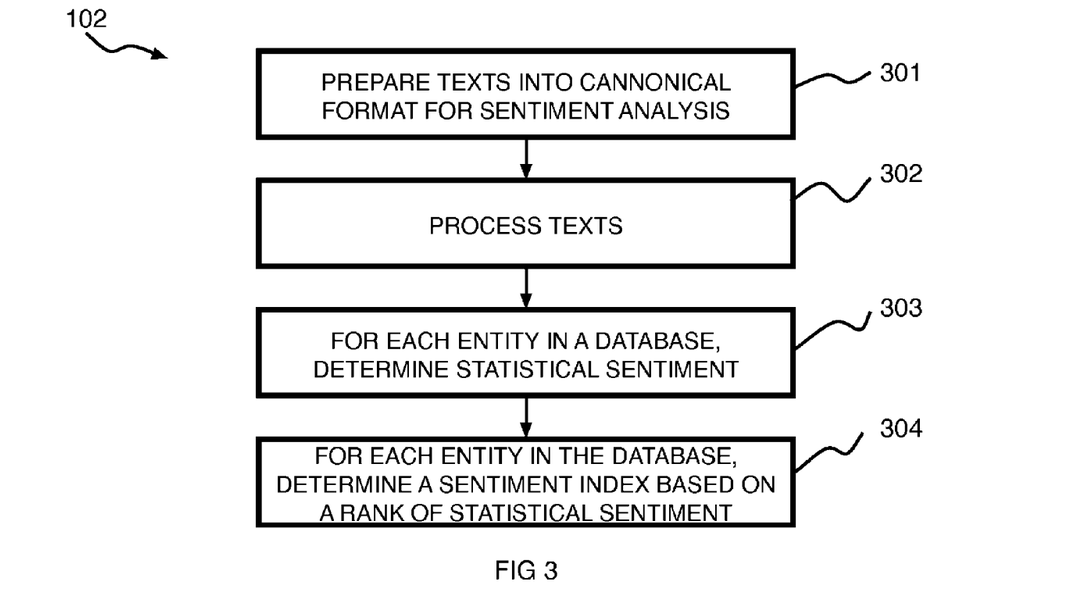
FIG. 3 is a flow chart of a method for applying a sentiment dictionary for determining a sentiment index according to an embodiment of the present disclosure.
Figure 4:
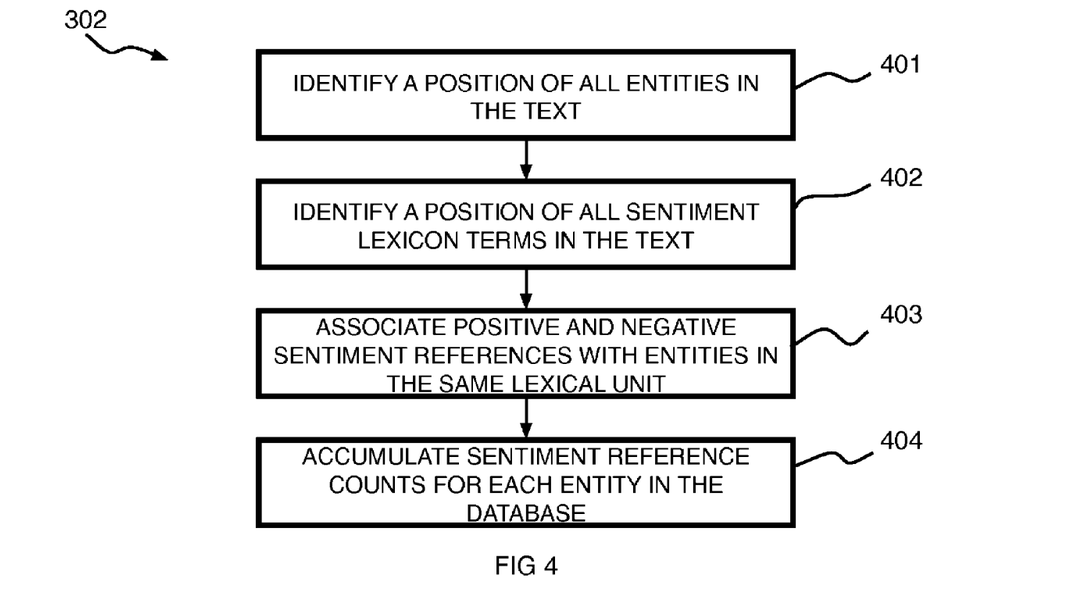
FIG. 4 is a flow chart of a method for processing input text according to an embodiment of the present disclosure.

Referring to FIGS. 3 and 4 and the interpretation and scoring of sentiment data 102; input texts, such as news articles, blogs, etc., are prepared into canonical format for sentiment analysis 301. The input texts are processed 302 and for each entity in a database, a statistical sentiment is determined 303. Further, given the statistical sentiment, a sentiment index is determined based on a rank of the statistical sentiment 304.

A sentiment lexicon (e.g., as determined according to FIG. 2) is used to mark up the sentiment words and associated entities in the corpus 302. This includes identifying a position of an entity in the input texts 401 and identifying a position of the sentiment lexicon terms in the input texts 402.

A sentiment analyser, e.g., implemented in hardware or software (see for example, FIG. 12), reverses the polarity of a sentiment lexicon term is whenever it is preceded by a negation. The polarity strength is increased/decreased when a word is preceded by a modifier. Thus not good=−1; good=+1; very good=+2.

The sentiment analyzer ignores articles that are detected as being a duplicate of another. This substantially prevents articles from news syndicates from having a larger impact on the sentiment than other articles. Since the system processes vast quantities of text on a daily basis, speed considerations limit careful parsing. Instead, the co-occurrence of an entity and a sentiment word in the same sentence to mean that the sentiment is associated with that entity may be used. This is not always accurate, particularly in complex sentences. Still the volume of text processed enables the generation of accurate sentiment scores.

Entity references under different names are aggregated, either manually or automatically. Because techniques are employed for pronoun resolution, more entity/sentiment co-occurrences can be identified than occur in raw news text. Further, Lydia's system for identifying co-reference sets associates alternate references such as George W. Bush and George Bush under the single synonym, set header George Bush. This consolidates sentiment pertaining to a single entity.

The raw sentiment scores are used to track trends over time, for example, polarity 403 and subjectivity 404. Polarity 403 determines if the sentiment associated with the entity is positive or negative. Subjectivity 404 determines how much, sentiment (of any polarity) the entity garners.

Subjectivity 404 indicates proportion of sentiment to frequency of occurrence, while polarity 403 indicates percentage of positive sentiment references among total sentiment references. Turning to polarity 403, world polarity is evaluated using sentiment data for all entities for the entire time period;

$$world\_polarity = \frac{positive\_sentiment\_references}{total\_sentiment\_references}$$

TABLE 3

| Dimension correlation using monthly data | | | | | | | |
|---|---|---|---|---|---|---|---|
| DIMENSION | BUS | CRIME | CEN | HEALTH | MEDIA | POL | SPORT |
| BUSINESS | — | −0.004 | 0.278 | 0.187 | 0.189 | 0.416 | 0.414 |
| CRIME | −0.004 | — | 0.317 | 0.182 | −0.117 | −0.033 | −0.125 |
| GENERAL | 0.278 | 0.317 | — | 0.327 | 0.253 | 0.428 | 0.245 |
| HEALTH | 0.187 | 0.182 | 0.327 | — | 0.003 | 0.128 | 0.051 |
| MEDIA | 0.189 | −0.117 | 0.253 | 0.003 | — | 0.243 | 0.241 |
| POLITICS | 0.416 | −0.033 | 0.428 | 0.128 | 0.243 | — | 0.542 |
| SPORTS | 0.414 | −0.125 | 0.245 | 0.051 | 0.241 | 0.542 | — |

Entity polarity i is evaluated using sentiment data for that day (day i) only:

$$\text{entity\_polarity}_i = \frac{\text{positive\_sentiment\_references}_i}{\text{total\_sentiment\_references}_i}$$

Index stability requires that excessive swings in the event of limited sentiment data be avoided. Thus, one can interpolate between the individual entity polarity and global world polarity components based on the frequency of sentiment references. These normalized polarity scores are mapped to percentile scores. The polarity score of an entity without sentiment references is defined as 50th percentile. Entities with positive sentiment scores (e.g., the majority) are assigned percentiles in the range (50, 100], with negative entities assigned scores in the range [0, 50). Hence the most positive entity for the day will have a score of 100 and the most negative one a score of 0.

Table 3 shows the correlation coefficient between the various sentiment indices. Typically, pairs of indices are positively correlated but not very strongly. This is good, as it shows each subindex measures different things. The general index is the union of all the indices and hence is positively correlated with each individual index.

Referring to the subjectivity scores 404. The subjectivity time series reflects the amount of sentiment an entity is associated with, regardless of whether the sentiment is positive or negative. Reading all news text over a period of time and counting sentiment in it gives a measure of the average subjectivity levels of the world. World subjectivity is evaluated using sentiment data for all entities for the entire time period;

$$\text{world\_subjectivity} = \frac{\text{total\_sentiment\_references}}{\text{total\_references}}$$

Entity subjectivity/is evaluated using sentiment data for that day (day i) only:

$$\text{entity\_subjectivity}_i = \frac{\text{total\_sentiment\_references}_i}{\text{total\_references}_i}$$

As in case of the polarity scores, these normalized subjectivity scores are interpolated and mapped to percentiles.

Fluctuations in daily reference frequency for a particular entity can result in over-aggressive spikes/dips in reputation. To overcome these problems, smoothing techniques may be implemented. For example, time-weighted averaging or frequency-weighted averaging may be used.

For time-weighted averaging, an exponential-decay model with decay constant c, $0 \leq c \leq 1$ over a k-day window of history is assumed. Let $\text{pol\_perc}_i$ denote the polarity score of an entity on day i. Then the decay-smoothed score for day n is $$\text{decay\_sm}_n = \frac{\sum_{i=0}^{k-1} \text{pol\_perc}_{n-i} * c^i}{\sum_{i=0}^{k-1} c^i}$$

The decay parameter determines how quickly a change in entity sentiment is reflected in the time series. This method sometimes results in inaccurate polarity scores, because it accords excessive importance to days of low news volume.

For frequency-weighted averaging: Let $\text{freq}_i$ denote the frequency of occurrence of the given entity on day i. The analogous frequency-smoothed score is $$\text{freq\_sm}_n = \frac{\sum_{i=0}^{k-1} \text{pol\_perc}_{n-i} * \text{freq}_i}{\sum_{i=0}^{k-1} \text{freq}_i}$$

Weighting by frequency substantially ensures that the resultant score is most influenced by scores on important days, and worked better for us than time-weighted sentiment averaging.

Referring to historical polarity scores, it is common for an entity to feature prominently in the news and then fade from view. For example, Clarence Ray Allen was prominent and negative in the news prior to his January 2006 execution, but has (understandably) contributed little since then. Still, his current reputation has drifted towards our median score on the basis of his relatively few sentiment-free references since then.

This implies the need for a historical polarity score which better retains state. A score is determined for every entity in substantially the same manner as polarity scores, except by aggregating all entity sentiment data over the entire period of time (versus day-to-day totals).

For news and blog analysis, the issues and the people discussed in blogs varies considerably from newspapers. In a study of entities reported on in both, blogs and news, positive sentiments are reported more often in newspapers than in blogs, while negative sentiments are reported fairly equally (143 negative entities in newspapers vs. 155 in blogs).

TABLE 4

Top positive entities in new (left) and blogs (right).

| Actor | Net sentiment News | Blog | Actor | Net sentiment Blog | News |
|---|---|---|---|---|---|
| Felicity Huffman | 1.337 | 0.774 | Joe Paterno | 1.527 | 0.881 |
| Fernando Alonso | 0.977 | 0.702 | Phil Mickelson | 1.104 | 0.652 |
| Dan Rather | 0.906 | −0.040 | Tom Brokaw | 1.042 | 0.359 |
| Warren Buffett | 0.882 | 0.704 | Sasha Cohen | 1.000 | 0.107 |
| Joe Paterno | 0.881 | 1.527 | Ted Stevens | 0.820 | 0.118 |
| Ray Charles | 0.843 | 0.138 | Rafael Nadal | 0.787 | 0.642 |
| Bill Frist | 0.819 | 0.307 | Felicity Huffman | 0.774 | 1.337 |
| Ben Wallace | 0.778 | 0.570 | Warren Buffett | 0.704 | 0.882 |
| John Negroponte | 0.775 | 0.059 | Fernando Alonso | 0.702 | 0.977 |
| George Clooney | 0.724 | 0.288 | Chauncey Billups | 0.685 | 0.580 |
| Alicia Keys | 0.724 | 0.147 | Maria Sharapova | 0.680 | 0.133 |
| Roy Moore | 0.720 | 0.349 | Earl Woods | 0.672 | 0.410 |
| Jay Leno | 0.710 | 0.107 | Kasey Kahne | 0.609 | 0.556 |
| Roger Federer | 0.702 | 0.512 | Tom Brady | 0.603 | 0.657 |
| John Roberts | 0.698 | −0.372 | Ben Wallace | 0.570 | 0.778 |

Table 4 lists the people that are the most positive in newspapers and blogs, respectively. American investor Warren Buffet and Formula 1 driver Fernando Alonso are regarded positively both in blogs and newspapers. Other sportsmen, Rafael Nadal and Maria Sherapova are also among the top positive people in blogs. Because the percentile ratings of news and blogs are not directly comparable, results are reported in terms of net positive and negative sentiment.

TABLE 5

Top negative entities in news (left) and blogs (right).

| Actor | Net sentiment News | Blog | Actor | Net sentiment Blog | News |
|---|---|---|---|---|---|
| Slobodan Milosevic | −1.674 | −0.964 | John A. Muhammad | −3.076 | −0.979 |
| John Ashcroft | −1.294 | −0.266 | Sammy Sosa | −1.702 | 0.074 |
| Zacarias Moussaoui | −1.239 | −0.908 | George Ryan | −1.511 | −0.789 |
| John A. Muhammad | −0.979 | −3.076 | Lionel Tate | −1.112 | −0.962 |
| Lionel Tate | −0.962 | −1.112 | Esteban Loaiza | −1.108 | 0.019 |
| Charles Taylor | −0.818 | −0.302 | Slobodan Milosevic | −0.964 | −1.674 |
| George Ryan | −0.789 | −1.511 | Charles Schumer | −0.949 | 0.351 |
| Al Sharpion | −0.782 | 0.043 | Scott Peterson | −0.937 | −0.340 |
| Peter Jennings | −0.781 | −0.372 | Zacarias Moussaoui | −0.908 | −1.239 |
| Saddam Hussein | −0.652 | −0.240 | William Jefferson | −0.720 | −0.101 |
| Jose Padilla | −0.576 | −0.534 | King Gyanendra | −0.626 | −0.502 |
| Abdul Rahman | −0.570 | −0.500 | Ricky Williams | −0.603 | −0.470 |
| Adolf Hitler | −0.549 | −0.159 | Ernie Fletcher | −0.580 | −0.245 |
| Harriet Miers | −0.511 | 0.113 | Edward Kennedy | −0.575 | 0.330 |
| King Gyanendra | −0.502 | −0.626 | John Gotti | −0.554 | −0.253 |

Table 5 lists the most negative people appearing in newspapers and blogs. International criminals like Slobodan Milosevic and Zacarias Moassaoui are regarded losers in both blogs and newspapers. Certain controversial American political figures like Harriet Miers and Al Sharpton are regarded negatively in news-papers, but not in blogs while others like Charles Schumer and Edward Kennedy are thought of negatively only by bloggers.

By correlating the polarity and subjectivity scores to various independent measures of entity performance, such as sports team performance and stock market indices, these experiments yield confirmation of the validity of our sentiment measures.

Referring to another exemplary application, the state of a sports team is expected to be higher after a win than a loss. To test this prediction, the outcomes of every Major League Baseball game played between July 2005 to May 2006 were collected, A performance time-series was generated for each of the thirty teams by representing each win by 1 and each loss by 0.

These performance time-series can be correlated with the polarity and subjectivity scores with different lead/lag time intervals to study the impact of performance on sentiment.

Figure 9A:
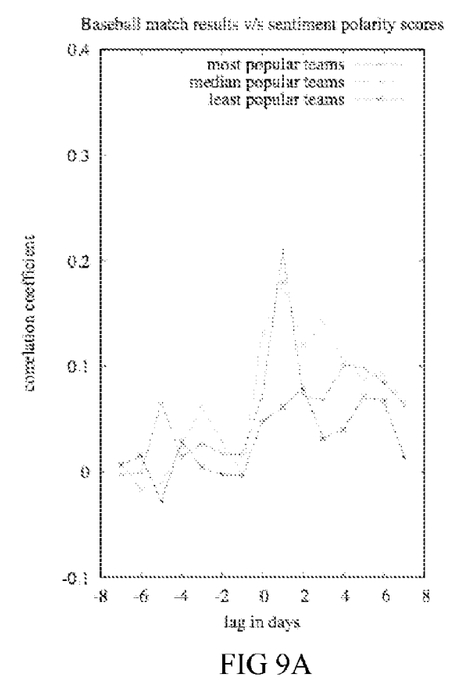
FIGS. 9A-B show sentiment scores correlations for frequency-based segregation of baseball teams.
Figure 9B:
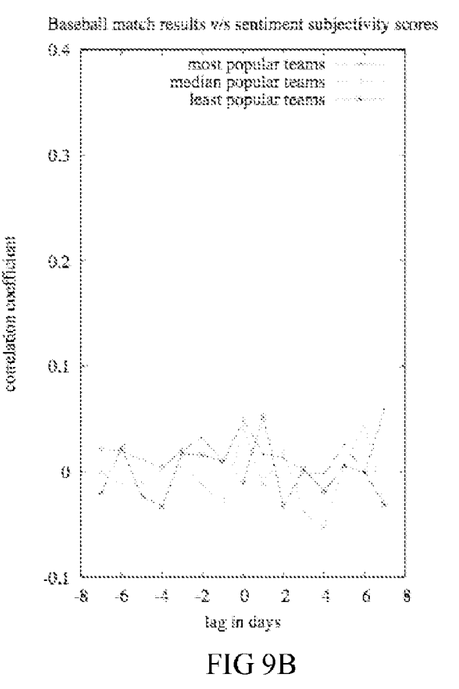

Results are reported in FIGS. 9A-B, showing a significant spike in sentiment correlation with a lag of +1 day, which reflects when newspapers report the match results. Sentimental impact of each game has a substantial half-life, hanging on for more than a week before disappearing. Ho corresponding spike in correlation was determined with subjectivity scores. This is as it should be, since newspapers comment on team performance irrespective of whether the team wins or loses the match.

Experiments with National Basketball Association (NBA) games over this period show substantially similar results.

Figure 10A:
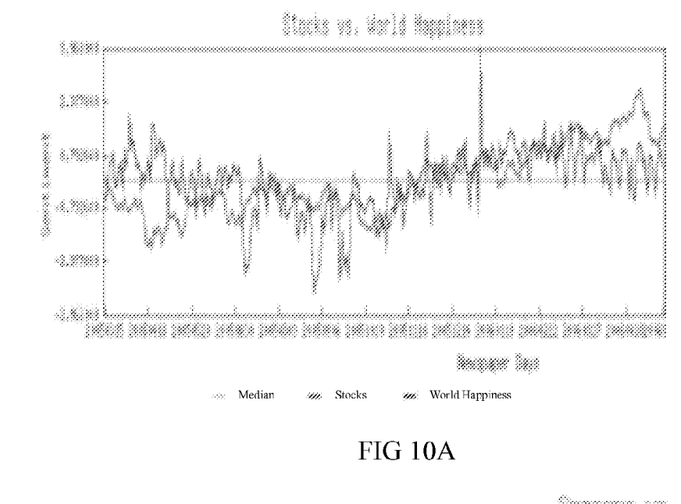
FIGS. 10A-B show correlations between Dow Jones Index and world sentiment on a daily (l) and monthly (r) basis according to an embodiment of the present disclosure.
Figure 10B:
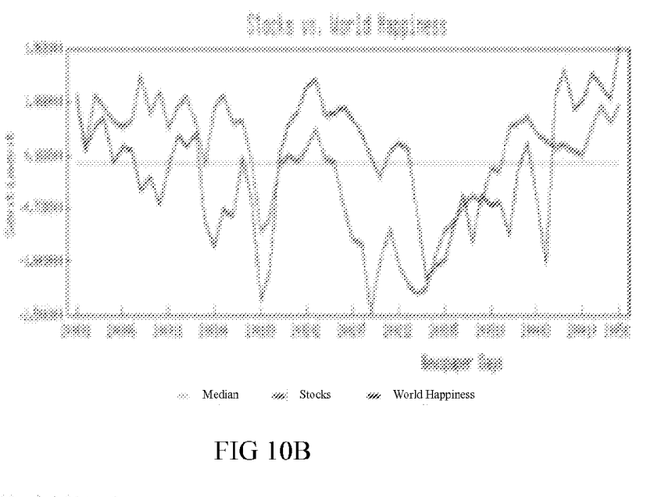

In another exemplary experiment, stock indexes and world sentiment index are tracked. Daily time series of the relative occurrences of positive and negative words in news text yielded a measure of the "happiness" of the world. It can foe reasoned that world sentiment is closely related to the state of the economy, which is reflected generally by the stock market. To test this hypothesis, the global index is correlated to the Dow Jones Index stock index. FIG. 10A shows the similarity these indices on a daily bases from March 2005 to May 2006. The indices show a correlation coefficient of +0.41 with a time lag of 1 day, as expected given reportage delays. FIG. 10B shows correlation of the stock and happiness indices on a monthly basis, over the five-year period before this window, scoring a correlation of +0.33.

Figure 11:
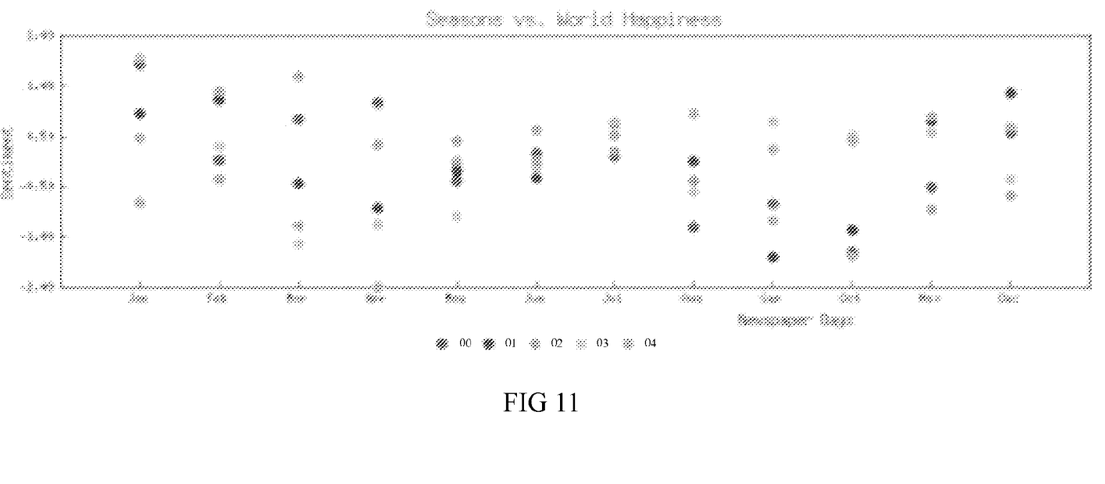
FIG. 11 shows calendar effects on our world sentiment index according to an embodiment of the present disclosure.

In yet another exemplary experiment, seasons and world sentiment index are tracked. A plot of the world sentiment index against the seasons of the year, shown in FIG. 11, shows that the volatility in world sentiment is substantially reduced during the summer months, as most of the industrial world takes its summer vacations. There also seers, to be other periodic seasonal flows in sentiment. Interestingly, the lowest time point on the graph is not the period of the World Trade Center attack (September 2001) but rather April 2004, reflecting the Madrid train bombings, the start of insurgency in Iraq, and the breaking of the Abu Ghraib prison story.

It is to be understood that the present invention may foe implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 12:
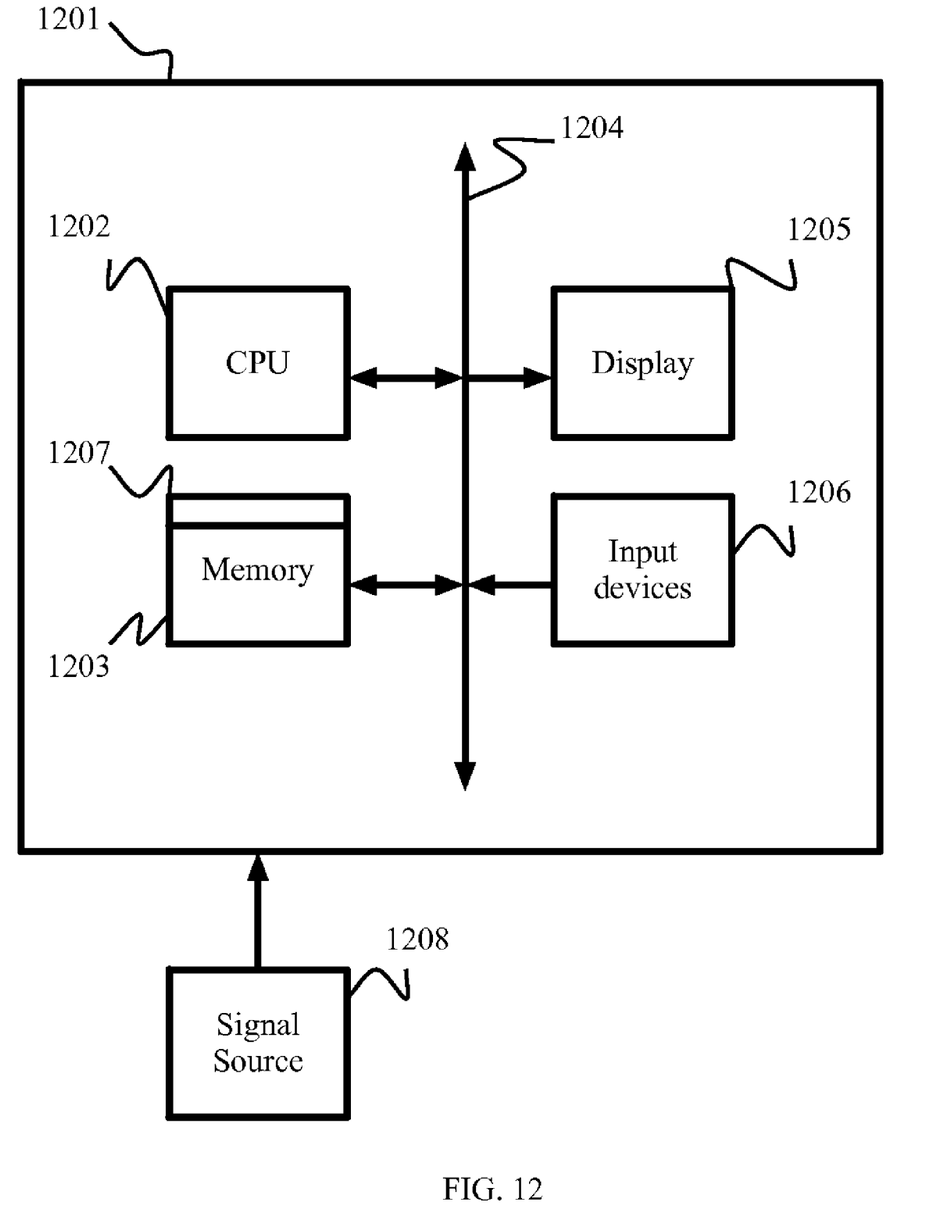
FIG. 12 depicts a computer system for implementing a sentiment analysis system according to an embodiment of the present disclosure.

Referring to FIG. 12, according to an embodiment of the present invention, a computer system 1201 for sentiment analysis can comprise, inter alia, a central processing unit (CPU) 1202, a memory 1203 and an input/output (I/O) interface 1204. The computer system 1201 is generally coupled through the I/O interface 1204 to a display 1205 and various input devices 1206 such as a mouse and keyboard. The support circuits can include circuits such as cache, power supplies, clock circuits, and a communications bus. The memory 1203 can include random access memory (RAM), read, only memory (ROM), disk, drive, tape drive, or a combination thereof. The present invention can be implemented as a routine 120 that is stored in memory 1203 and executed by the CPU 1202 to process the signal from the signal source 1208. As such, the computer system 1201 is a general-purpose computer system that becomes a specific-purpose computer system when executing the routine 1207 of the present invention.

The computer platform 1201 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system, components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a sentiment analysis, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer readable medium embodying instructions executable by a processor to perform a method for determining a sentiment lexicon associated with an entity, the method steps comprising:
   inputting a plurality of texts associated with the entity;
   labeling seed words in the plurality of texts as positive or negative;
   determining a score estimate for the plurality of words based on the labeling;
   re-enumerating paths of the plurality of words and determining a number of sentiment alternations;
   determining a final score for the plurality of words using only paths whose number of alternations is within a threshold;
   converting the final scores to corresponding s-scores for each of the plurality of words; and
   outputting the sentiment lexicon associated with the entity.

2. The method of claim 1, further comprising:
   determining synonyms and antonyms of the plurality of words;
   ordering the synonyms and the antonyms of the plurality of words by sense; and
   adding a set of the synonyms and the antonyms to the seed words, wherein the set is limited by a threshold prior to the converting of the final scores.

3. The method of claim 1, further comprising discarding ambiguous words of the plurality of words.

4. The method of claim 1, wherein the re-enumeration is independent of how the sentiment lexicon is used.

5. The method of claim 1, wherein the entity is a document.

6. The method of claim 1, wherein the entity is a relationship between component entities.

7. The method of claim 1, wherein the entity is a group of component entities.

* * * * *